United States Patent
Dykhuizen et al.

(10) Patent No.: US 6,674,748 B1
(45) Date of Patent: Jan. 6, 2004

(54) METHODS, APPARATUSES AND SYSTEMS FOR TRANSITIONING FROM A SIGNALING SYSTEM 7 NETWORK TO A DATA NETWORK AT A SIGNALING SYSTEM 7 GATEWAY

(75) Inventors: David Brad Dykhuizen, Plano, TX (US); Jacqueline Ann Dykhuizen, Plano, TX (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/468,584

(22) Filed: Dec. 21, 1999

(51) Int. Cl.[7] .............................................. H04L 12/66
(52) U.S. Cl. ...................... 370/352; 370/237; 370/466
(58) Field of Search ................................. 379/230, 354; 370/352, 524

(56) References Cited

U.S. PATENT DOCUMENTS

| | | | |
|---|---|---|---|
| 5,898,667 A | 4/1999 | Longfield et al. | 370/225 |
| 6,215,765 B1 * | 4/2001 | McAllister et al. | 370/217 |
| 6,278,707 B1 * | 8/2001 | MacMillan et al. | 370/352 |
| 6,356,627 B1 | 3/2002 | Hayball et al. | 379/112.01 |

* cited by examiner

Primary Examiner—Ahmad F. Matar
Assistant Examiner—Karen Le

(57) ABSTRACT

The present invention provides a method of transitioning messages from a Signaling System 7 Network to a data network at a Signaling System 7 Gateway. The method is accomplished by receiving one or more Signaling System 7 messages at the Signaling System 7 Gateway, determining states of accessability of one or more extended capability codes listed within the Signaling System 7 gateway, where each extended capability code corresponds to one or more signaling end points within the data network, terminating the Signaling System 7 messages at the Signaling System 7 Gateway, determining the accessability of the signaling end points associated with the Signaling System 7 messages, and routing the Signaling System 7 messages based upon the accessability of the signaling end points.

32 Claims, 4 Drawing Sheets

METHODS, APPARATUSES AND SYSTEMS FOR TRANSITIONING FROM A SIGNALING SYSTEM 7 NETWORK TO A DATA NETWORK AT A SIGNALING SYSTEM 7 GATEWAY

TECHNICAL FIELD OF THE INVENTION

The present invention relates generally to the field of telecommunications and more particularly to methods, apparatuses and systems for transitioning from a Signaling System 7 network to a data network at a Signaling System 7 gateway.

BACKGROUND OF THE INVENTION

The Telecommunications Industry has steadily grown from the times of wired networks. Traditionally, most telecommunications networks were Signaling System 7 Networks. Data traveling on the networks would be in Signaling System 7 protocol from the originating end node in the network to the destination end node in the network. Today, however, new data networks are emerging in the telecommunications industry. Networks based upon the Internet Protocol are becoming more widespread. The main reason for the rapid growth is the relative inexpense associated with such networks.

A problem exists, however, with the ever changing telecommunications industry. Disregarding or building around the Signaling System 7 architecture can be costly. Moreover, the Signaling System 7 networks tend to be reliable, a known commodity. Thus, telecommunications companies seek ways to merge the pre-existing Signaling System 7 network with the modern networks, such as the Internet Protocol network.

Such transitioning already occurs in network configurations today. Many Signaling System 7 messages travel through a Signaling System 7 networks destined for a signaling end point located within an Internet Protocol network. The problem, however, is that the transition from the Signaling System 7 network to the Internet Protocol network occurs only near the end of travel path for the message. This means that the message is traveling mostly across the much more expensive Signaling System 7 network, and spending little time traveling as a cheaper Internet Protocol message. Thus, new means for transitioning messages from Signaling System 7 messages to Internet Protocol messages is needed.

SUMMARY OF THE INVENTION

The present invention provides a method of transitioning messages from a Signaling System 7 Network to a data network at a Signaling System 7 Gateway. The method is accomplished by receiving one or more Signaling System 7 messages at the Signaling System 7 Gateway, determining states of accessability of one or more extended capability codes listed within the Signaling System 7 gateway, where each extended capability code corresponds to one or more signaling end points within the data network, terminating the Signaling System 7 messages at the Signaling System 7 Gateway, determining the accessability of the signaling end points associated with the Signaling System 7 messages, and routing the Signaling System 7 messages based upon the accessability of the signaling end points.

The present invention also provides a computer program embodied on a computer readable medium for transitioning messages from a Signaling System 7 Network to an data network. The computer program can include a code segment for receiving one or more Signaling System 7 messages at the Signaling System 7 Gateway, a code segment for determining states of accessability of one or more extended capability codes listed within the Signaling System 7 Gateway, each extended capability code corresponding to one or more signaling end points within the data network, a code segment for terminating the Signaling System 7 messages at the Signaling System 7 Gateway, a code segment for determining the accessability of the signaling end points associated with the Signaling System 7 messages, and a code segment for routing the Signaling System 7 messages based upon the accessability of the signaling end points.

DETAILED DESCRIPTION

Figure 1:
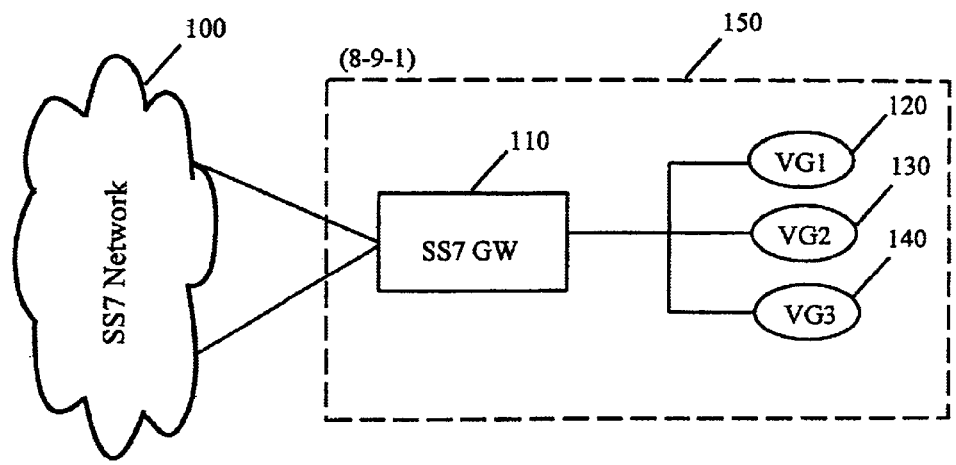
FIG. 1 is a schematic diagram of an Signaling System 7 network as it presently exists today.
Figure 2:
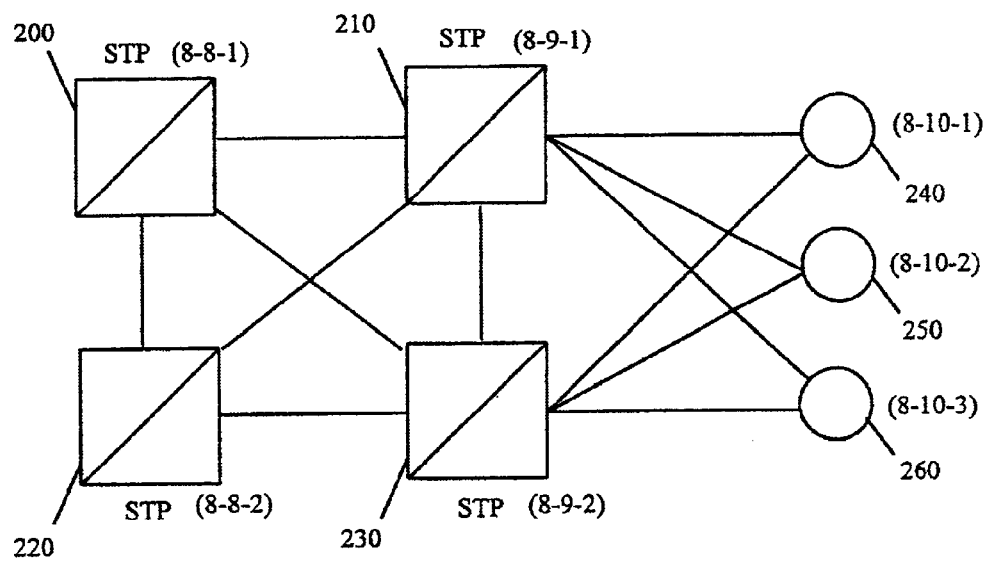
FIG. 2 is a schematic diagram showing a mated pair configuration of signaling transfer points as presently used in Signaling System 7 network today.

Referring to FIGS. 1 and 2, a basic Signaling System 7 (SS7) network architecture, in accordance with the prior art, is depicted. As shown, an SS7 network 100 is in communication with an SS7 gateway 110. The SS7 gateway 110 is in communication with multiple signaling end points 120, 130, and 140. The signaling end points 120, 130, and 140 are represented as voice gateways but could be any type of signaling end point. Under normal operation, an SS7 message is sent from the SS7 network 100 to the SS7 gateway 110. The SS7 message is destined for a signaling end point, such as the voice gateway 120. Once the SS7 gateway 110 receives the SS7 message, it transitions the SS7 message to an Internet Protocol message conforming with the Internet Protocol standard and transfers the message to the destined signaling end point 120. The signaling end points 120, 130, and 140 all reside in a data network. The data network can be an Internet Protocol Network, a Transmission Control Protocol Network, a User Datagram Protocol, and the like. Thus, the SS7 gateway must transition all messages from an SS7 format to a data network format.

The architecture presented in FIG. 1 poses a significant disadvantage because the SS7 gateway and the various signaling end points are seen by the SS7 network as one point code, as shown by block 150. A point code is a physical representation or address for particular elements within a communications network. In FIG. 1, the SS7 gateway 110 and the end points 120, 130, and 140 are seen by the SS7 network as a single point code (8-9-1). All traffic from the SS7 network destined for 8-9-1 will be received by the SS7 gateway 110 and transferred to the signaling end points 120, 130, and 140. If, however, a message is sent from the SS7 network 100 to the SS7 gateway 110 and the message is destined for the point code (8-9-2), for example, then that message will be discarded and a message will be sent back from the SS7 gateway 110 to the SS7 network 100 informing the SS7 network 100 that the SS7 gateway 110 cannot receive messages for (8-9-2). Similarly, if the SS7 gateway 110 is inaccessible, all elements associated with point code (8-9-1) will be inaccessible. In addition, if one of the signaling end points 120, 130, or 140 is inaccessible, then the point code (8-9-1) operates at a reduced capacity. The SS7 gateway cannot manage the states of the signaling end points 120, 130 and 140.

Referring now to FIG. 2, a further illustration of the general architecture of a SS7 network of the prior art is shown. FIG. 2 depicts several signaling transfer points labeled 200, 210, 220, and 230, respectively. The signaling transfer points are in a mated pair configuration. This means, that the signaling transfer point 200 and the signaling transfer point 210 are mated with the signaling transfer points 220 and 230, respectively. Signaling end points 240, 250, and 260 are also depicted in FIG. 2. As shown, the signaling transfer points 210 and 230 are capable of transferring messages to all of the signaling end points.

The signaling transfer points and the signaling end points all have a unique point code associated with them. When an SS7 message comes from the SS7 network, the message will have a point code as its destination. The point code is associated with a specific element within the network. For example, an SS7 message sent from the SS7 network may be destined for point code (8-10-1), which corresponds to signaling end point 240. If the SS7 message is received by the signaling transfer point 200, signaling transfer point 200 can then transfer the SS7 message to signaling transfer point 210. Once received at signaling transfer point 210, the message will be sent to the signaling end point 240. The mated pair of signaling transfer points 210 and 230 are linked to the signaling end points 240, 250, and 260. In this configuration, signaling transfer points 210 and 230 are referred to as the home pair for signaling end points 240, 250, and 260. By having two signaling transfer points connected to the signaling end points in a mated pair configuration, failure of the network due to a failure of the link between a signaling transfer point and a signaling end point can be avoided.

The problem with this architecture scheme is that SS7 messages are required to stay in the SS7 protocol format until they reach the end point. The present invention focuses on transitioning messages from an SS7 network to a data network at the signaling transfer point. The present invention also allows for a Signaling System 7 gateway to manage multiple signaling end points.

Figure 3:
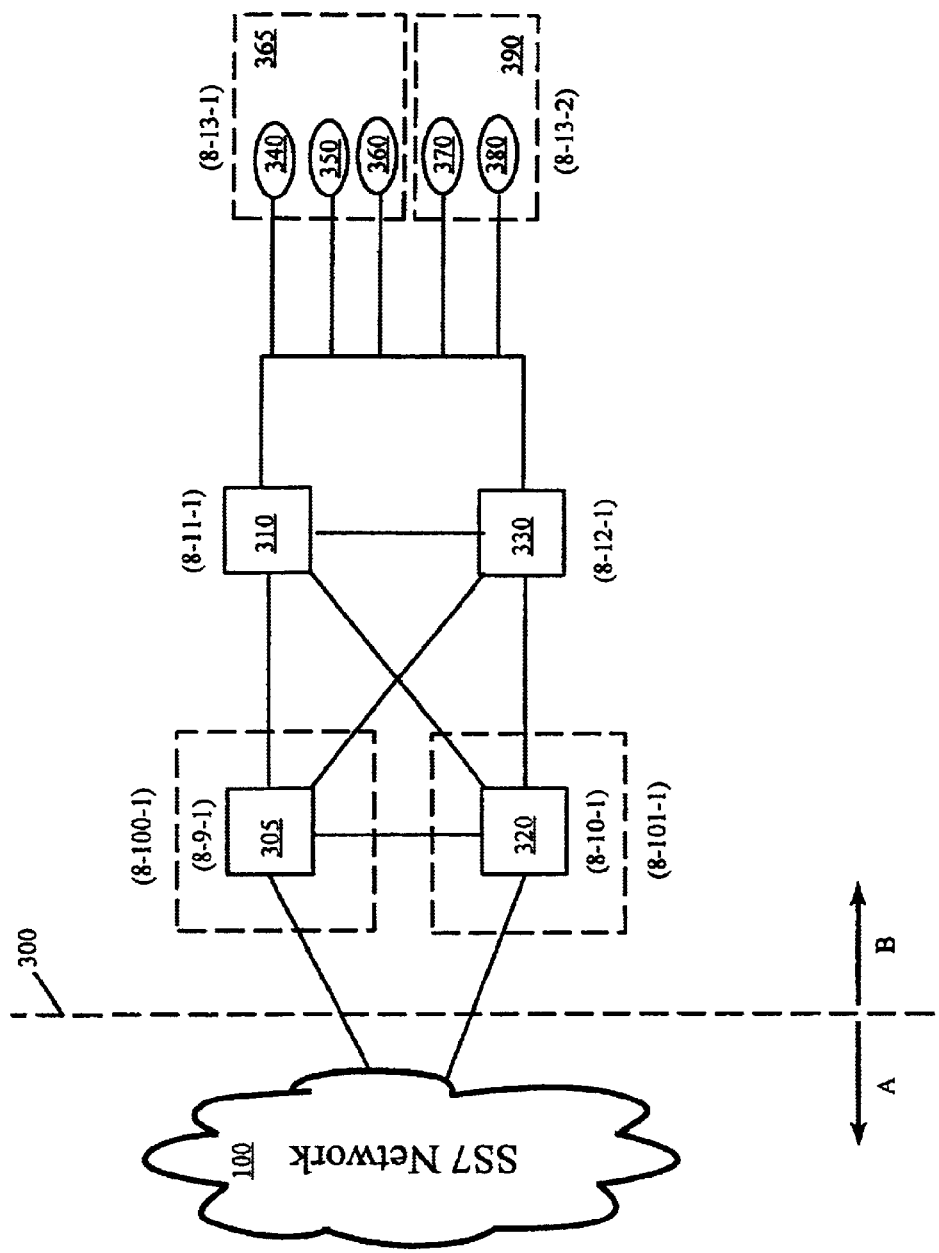
FIG. 3 is a schematic diagram of the system of the present invention.

Referring to FIG. 3, a schematic diagram of the network architecture of the present invention is shown. FIG. 3 shows a communications network connecting Service Provider A with Service Provider B. A SS7 Network 100 is shown in communication with a mated pair of signaling transfer points 305 and 320 across a network boundary 300. Signaling transfer points 310 and 330 represent a home pair for signaling end points 340, 350, 360, 370, and 380, which all reside in a data network. Also shown in FIG. 3 are capability codes or point code aliases (8-100-1) and (8-101-1). Capability codes exist so that a service provider, such as Service Provider B in FIG. 3, can change the architecture and underlying structure of its network or network elements without having to reveal the changes to another service provider, such as Service Provider A. A capability code allows a service provider to keep changes in their network secret while still maintaining network connectivity.

A capability code acts like a point code. A message is sent from the SS7 Network 100 destined for the point code (8-100-1). The SS7 Network of Service Provider A believes the message is destined for the end node (8-100-1) and would appear to be traveling to some physical node within Service Provider B's network. The point code (8-100-1), however, is actually a capability code. The capability code (8-100-1) is not the physical address for any node but rather represents a node, in this case signaling transfer point 305. When Network B receives a SS7 message for (8-100-1), the network immediately knows to route the SS7 message to signaling transfer point 305. Signaling transfer point 305 can then route the SS7 message to its intended destination. Service Provider B can remove or add elements, such as other signaling transfer points, in its network without notifying or adjusting the codes given to Service Provider A because Service Provider A receives the capability codes and does not receive the physical addresses of network elements.

Under the present invention, the concept of capability codes are broadened for use within the network of Service Provider B. The present invention allows signaling transfer points, such as 310 and 330, to terminate SS7 messages, transition the messages into a data network format, determine whether the destination signaling end points, for which the messages are destined, are accessible, and route the messages to the appropriate signaling end points. To achieve this capability, "Extended Capability Codes" are defined within the signaling transfer point, and more particularly in the SS7 gateway.

Multiple signaling end points 340, 350, 360, 370, and 380 are shown in communication with the signaling transfer points 310 and 330. The signaling end points each have their own associated point code or physical address. Under the present invention, the signaling end points 340, 350, and 360 are grouped together under one Extended Capability Code, (8-13-1), depicted by block 365. Likewise, signaling to end points 370 and 380 are grouped under an Extended Capability Code, (8-13-2), as depicted by block 390.

After the Extended Capability Codes are defined, representations of the Extended Capability codes can be listed within the home pair signaling transfer point, and thus, in the SS7 gateway. The listings provide the SS7 gateway or signaling transfer points the ability to associate the appropriate signaling end points with each Extended Capability Code. By defining the signaling end points in terms of an Extended Capability Code, the present invention allows messages received from an SS7 network to terminate at a signaling transfer point, such as 310. When the network receives a message destined for an Extended Capability Code, the network believes that the ultimate destination for the message is the address corresponding to the Extended Capability Code. The Extended Capability Code, however, is only an alias for multiple signaling end points, the true destination for the message.

Figure 4:
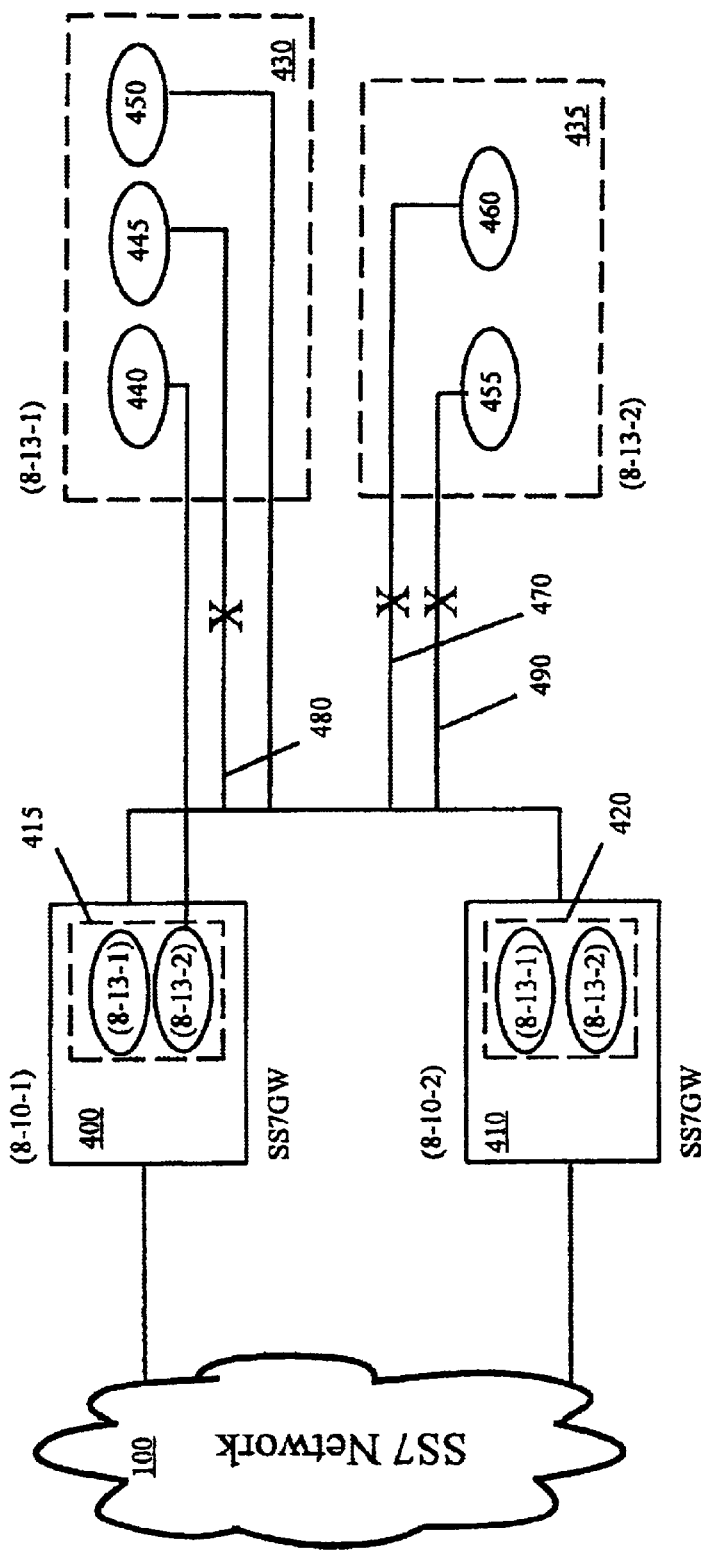
FIG. 4 is a schematic diagram illustrating in more detail the system of the present invention.

FIG. 4 is a schematic diagram illustrating in more detail the architecture of the new SS7 gateway incorporating Extended Capability Codes. An SS7 network 100 is shown in communication with two SS7 gateways 400 and 410. Each SS7 gateway can manage one or more signaling end points. The signaling end points are 440, 445, 450, 455, and 460 respectively. The signaling end points 440 through 460 are in communication with the SS7 gateways 400 and 410. The signaling end points reside in a data network. As shown, signaling end points 440, 445 and 450 are defined under the Extended Capability Code (8-13-1), as represented by block 430. Likewise, signaling end points 455 and 460 are defined under the Extended Capability Code (8-13-2), as represented by block 435. The Extended Capability Codes are listed within the SS7 gateways, as are shown by 415 and 420. By listing the Extended Capability Codes within the SS7 gateways, the SS7 gateways can manage the signaling end points, 440 through 460.

To manage the signaling end points the SS7 gateways 400 and 410 routinely test accessibility to the signaling end points 440 through 460. For example, the signaling end point 445 is not available to receive messages, as indicated by the x overlink 480. If the SS7 network 100 tries to send a message to the signaling end point 445, the SS7 Gateway 400 will discard the message and will return a blocking message.

Because the signaling end points are defined under an Extended Capability Code, the SS7 gateway can manage the states of Extended Capability Code. In FIG. 4, the Extended Capability Code (8-13-1), given by block 430, has associated with it signaling end points 440, 445, and 450. A message sent to signaling end point 445 would reveal that the pathway between the SS7 gateway 400 and 410 and the signaling end point 445 is inaccessible. This causes the SS7 gateway to list the signaling end point 445 as inaccessible. This will invoke standard Route Set Test procedures within the SS7 network 100. The Extended Capability Code (8-13-1), however, is accessible because both signaling end point 440 and signaling end point 450 are accessible. Similarly, Extended Capability Code (8-13-2), given by block 435, would be listed as inaccessible because both signaling end point 455 and signaling end point 460 are inaccessible.

The SS7 gateways can list the Extended Capability Codes as accessible, inaccessible, or restricted. By allowing the SS7 gateways to assess both the accessibility of the signaling end points and the Extended Capability Codes, the states of the Extended Capability Codes and the associated signaling end points can be managed. An Extended Capability Code will be listed as accessible as long as one of the signaling end points associated with the Extended Capability Code is accessible. Messages, however, destined for an inaccessible signaling end point can still be blocked because the SS7 gateway understands that the intended signaling end point is inaccessible.

Figure 5:
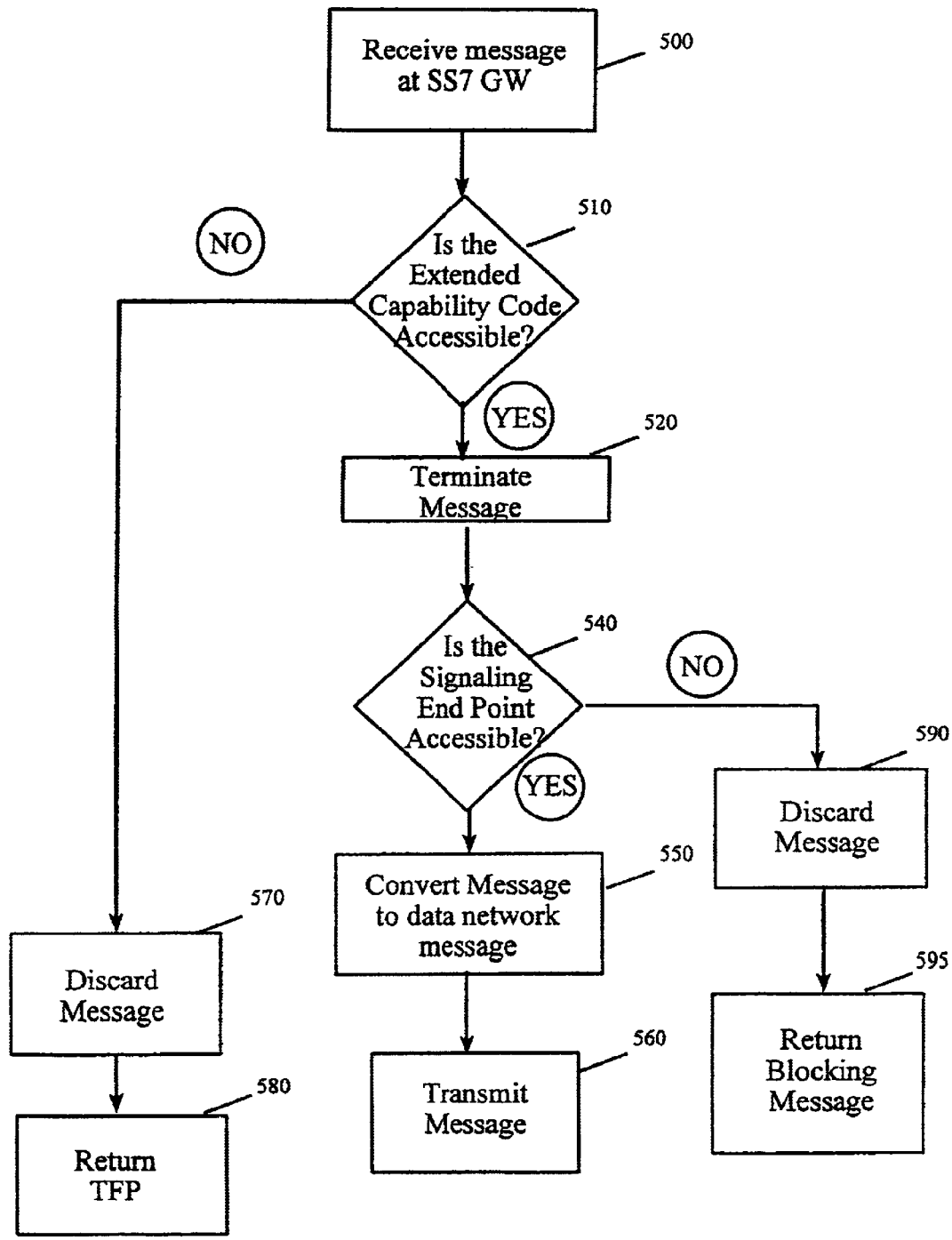
FIG. 5 is a flow diagram of the methods and computer programs of the present invention.

FIG. 5 is a flow diagram illustrating a method of the present invention. As shown by block 500, a message is received from the SS7 network at a SS7 gateway. When the message is received by the SS7 gateway destined for one of the Extended Capability Codes, the SS7 gateway determines the accessibility of the Extended Capability Code for which the message was received, as shown by block 510. If the message is intended for an Extended Capability Code that is not accessible, then the message is discarded, as shown by block 570, and a Transfer Prohibited Message is sent back to the origination source informing the origination source of the inaccessibility of the Extended Capability Code, as shown by block 580. If, however, the Extended Capability Code is accessible, the message is terminated, as shown by block 520. Termination of the message is accomplished because the destination address of the message, in this case an Extended Capability Code listed within the SS7 gateway, appears to have been reached. Termination of the message simply means stopping the message for further routing. Termination simply implies that the message is now being controlled by the SS7 gateway and that its path will be determined by the SS7 Gateway.

Once the message is terminated, a determination is then made whether the particular signaling end point, for which the message is destined, is accessible, as shown by block 540. If the signaling end point is inaccessible, then the message is discarded, as shown by block 590, and a blocking message sent back to the origination source, as shown by block 595. If, however, the signaling end point is accessible, then the SS7 gateway will convert the message from a SS7 message to a data network message, as shown by block 550. Once the message has been converted, the message is transmitted across the data network to the signaling end point, as shown by block 560.

The method of FIG. 5 can be implemented within the SS7 gateway or a signaling transfer point as a computer program. The computer program would be embodied on a computer readable medium. The computer program can include a code segment for receiving one or more Signaling System 7 (SS7) messages at an SS7 gateway. The computer program may also include a code segment for determining states of accessability of one or more Extended Capability Codes. The computer program can further include a code segment for terminating the SS7 messages at the SS7 gateway. Additionally, a code segment for determining the accessability of the signaling end points may be provided. The computer program can also include a code segment for routing the SS7 messages to the signaling end points based upon the accessibility of the signaling end points.

In addition, the computer program can include a code segment for converting the SS7 messages to a data network messages. A code segment for transmitting or discarding the SS7 messages based upon the accessibility of the signaling end point may also be provided.

What is claimed is:

1. A method of transitioning a message from a Signaling System 7 Network to a data network at a Signaling System 7 Gateway, the method comprising the steps of:

receiving one or more Signaling System 7 messages at the Signaling System 7 Gateway;

determining accessibility of one or more extended capability codes listed within the Signaling System 7 Gateway wherein each extended capability code corresponds to one or more signaling end points within the data network; and terminating a Signaling System 7 (SS7) message received at the Signaling System 7 Gateway for transitioning to the data network if an extended capability code associated with the received SS7 message is accessible.

2. The method of claim 1 further comprising:

determining accessibility of a signaling end point associated with the received SS7 message after the received SS7 message is terminated; and routing the received SS7 message to the associated signaling end point if the associated signaling end point is accessible.

3. The method of claim 2 further comprising:

converting the Signaling System 7 message to a data network message before the received SS7 message is routed.

4. The method of claim 3 wherein the data network message conforms with the Internet Protocol standard.

5. The method of claim 3 wherein the data network message conforms with the Transmission Control Protocol standard.

6. The method of claim 3 wherein the data network message conforms with the User Datagram Protocol standard.

7. The method of claim 3 wherein the step of routing further includes transmitting the data network message across the data network.

8. The method of claim 2 further comprising:

discarding the received Signal System 7 message, if the signaling end point is inaccessible.

9. The method of claim 8 further comprising:

sending a blocking message to a source from which the received Signaling System 7 message was originally sent after the received SS7 message is discarded.

10. The method of claim 1 wherein the Signaling System 7 Gateway includes at least one mated pair of signaling transfer points.

11. The method of claim 1 further comprising:

discarding the received SS7 message if the associated extended capability code is not accessible.

12. The method of claim 11 further comprising:

sending a notification to a source from which the received SS7 message was originally sent after the received SS7 message is discarded, said notification informing the source that the extended capability code associated with the received SS7 message is not accessible.

13. A Gateway for transitioning a message from a Signaling System 7 Network to a data network, said Gateway being coupled to me Signaling System 7 Network and the data network and being adapted to:

receive one or more Signaling System 7 (SS7) messages from the Signaling System 7 Network, determine accessibility of one or more extended capability codes listed within the Gateway, wherein each extended capability code corresponds to one or more signaling end points within the data network, and terminate a Signaling System 7 message received at the Gateway for transitioning to the data network if an extended capability code associated with the received SS7 message is accessible.

14. The gateway of claim 13 further being adapted to:

determine accessibility of a signaling end point associated with the received SS7 message after the received SS7 message is terminated; and route the received SS7 message to the associated signaling end point if the associated signaling and point is accessible.

15. The Gateway of claim 14 further being adapted to convert the received Signaling System 7 message a data network message before the received SS7 message is routed.

16. The Gateway of claim 15 wherein the data network message conforms with the Internet Protocol standard.

17. The Gateway of claim 15 wherein the data network message conforms with the Transmission Control Protocol standard.

18. The Gateway of claim 15 wherein the data network message conforms with the User Datagram Protocol standard.

19. The Gateway of claim 14 further being adapted to discard the received Signaling System 7 message if the signaling end point is inaccessible.

20. The Gateway of claim 19 further being adapted to send a blocking message to a source from which the received Signaling System 7 message was originally sent after the received SS7 message is discarded.

21. The system Gateway of claim 13 comprising at least one mated pair of signaling transfer points.

22. The gateway of claim 13 further being adapted to:

discard the received SS7 message if the associated extended capability code is not accessible.

23. The gateway of claim 22 further being adapted to:

send a notification to a source from which the received SS7 message was originally sent after the received SS7 message is discarded, said notification informing the source that the extended capability code associated with the received SS7 message is not accessible.

24. A computer program embodied on a computer readable medium for transitioning a message from a Signaling System 7 Network to a data network at a Signaling System 7 (SS7) Gateway comprising:

a code segment for receiving one or more Signaling System 7 messages at the a Signaling System 7 Gateway;

a code segment for determining accessibility of one or more extended capability codes listed within the Signaling System 7 Gateway, wherein each extended capability code corresponds to one or more signaling end points within the data network; and a code segment for terminating a Signaling System 7 message received at the Signaling System 7 Gateway for transitioning to the data network if an extended capability code associated with the received SS7 message is accessible.

25. The computer program of claim 24 further comprising:

a code segment for determining accessibility of a signaling end point associated with the received SS7 message after the received SS7 message is terminated; and a code segment for routing the received SS7 message to the associated signaling end point if the associated signaling end point is accessible.

26. The computer program of claim 25 a further comprising:

a code segment for converting the received Signaling System 7 message to a data network message before the SS7 message is routed.

27. The computer program of claim 25 the code segment for routing includes codes for transmitting the data network message across the data network.

28. The computer program of claim 25 further comprising:

a code segment for discarding the received Signaling System 7 message if the signaling end point is inaccessible.

29. The computer program of claim 28 further comprising:

a code segment for sending a blocking message to a source from which the received SS7 message was originally sent after the received SS7 message is discarded.

30. The computer program of claim 24 wherein the Gateway includes at least one mated pair of signaling transfer points.

31. The computer program of claim 24 further comprising:

a code segment for discarding the received SS7 message if the associated extended capability code is not accessible.

32. The computer program of claim 31 further comprising:

a code segment for sending a notification to a source from which the received SS7 message was originally sent after the received SS7 message is discarded, said notification informing the source that the extended capability code associated with the received SS7 message is not accessible.

* * * * *